(12) United States Patent
Mitera et al.

(10) Patent No.: US 6,976,564 B2
(45) Date of Patent: *Dec. 20, 2005

(54) QUICK CHANGE SHOCK ABSORBER

(75) Inventors: Richard T. Mitera, Canton, MI (US); Robert Heideman, Westland, MI (US)

(73) Assignee: Ace Controls, Inc., Farmington Hills, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/023,007

(22) Filed: Dec. 27, 2004

(65) Prior Publication Data

US 2005/0103588 A1    May 19, 2005

Related U.S. Application Data

(63) Continuation-in-part of application No. 10/684,734, filed on Oct. 14, 2003.

(51) Int. Cl.⁷ .................................................. F16F 9/54
(52) U.S. Cl. .............................. 188/321.11; 267/64.11; 425/450.1
(58) Field of Search ................ 188/321.11; 267/64.11, 267/119, 130, 113, 137, 139, 124; 425/450.1–451.7, 425/538, 541, 537, 526, 533, 534; 198/343.2, 198/802; 248/344.19, 161

(56) References Cited

U.S. PATENT DOCUMENTS

| | | | |
|---|---|---|---|
| 4,298,373 A | | 11/1981 | Mumford et al. |
| 4,694,939 A | | 9/1987 | Heideman et al. |
| 4,801,260 A | | 1/1989 | Oles et al. |
| 4,969,619 A | * | 11/1990 | Bauer et al. ................. 248/161 |
| 5,407,052 A | * | 4/1995 | Heideman et al. ........ 198/343.2 |
| 5,681,520 A | | 10/1997 | Koda et al. |
| 6,371,460 B1 | | 4/2002 | Orihara |

FOREIGN PATENT DOCUMENTS

| | | | |
|---|---|---|---|
| DE | 1201189 | * | 4/1958 |
| WO | WO 2005/040637 A1 | * | 5/2005 |

* cited by examiner

*Primary Examiner*—Douglas C. Butler
(74) *Attorney, Agent, or Firm*—Price, Heneveld, Cooper, DeWitt & Litton, LLP

(57) ABSTRACT

A quick change shock absorber for providing the quick and easy removal of a shock absorber from a fixture of an industrial machine. The quick change shock absorber provides a housing having a bore adaptable to hold a fluid therein. A piston is slidably disposed within the bore of the housing and is engageable with a driver for movement between an extended position, wherein the piston has a portion extending outwardly from the housing, and a retracted position, wherein the piston is disposed within the housing. A connecting member extends from the housing and is engageable with a fixture having a bore therein for releasably connecting and locating the housing to the fixture.

18 Claims, 5 Drawing Sheets

QUICK CHANGE SHOCK ABSORBER

RELATED APPLICATION

The subject application is a continuation-in-part of U.S. patent application Ser. No. 10/684,734, filed on Oct. 14, 2003.

FIELD OF THE INVENTION

The present invention relates to a shock absorber, and more particularly, a quick change shock absorber that utilizes a unique housing design to provide for the quick removal and replacement of the shock absorber.

BACKGROUND OF THE INVENTION

Shock absorbers or linear decelerators are often used on industrial equipment that requires the shock absorber or linear decelerator to cycle at very high rates. For instance, in the blow molding industry, plastic bottles are made by placing heated cylindrical blanks into a mold and inserting pressurized air into the blanks to stretch the mold radially to form to the mold. While the pressurization of the blank is occurring, a striker is inserted into the blank to engage the bottom of the blank and stretch the blank vertically. Shock absorbers or linear decelerators are utilized to cushion the impact of the vertical strikers. These blow molding machines may produce up to 20,000 to 40,000 bottles per hour, and therefore, the cycling rates of the striker and the wear on the shock absorbers is great. Such cycling and wear typically requires that the shock absorbers be replaced or maintained on a regular basis.

Previous designs have mounted the shock absorber in a manner which makes maintaining the shock absorber difficult. As seen in FIG. 1, the shock absorber 11 has a housing 13 with a piston rod 15 extending therefrom. The housing 15 of the shock absorber 11 has threads on its outer periphery and is threaded into a threaded bore 17 of a mount 19 of an industrial machine. The threaded bore 17 has a stepped diameter which forms a shoulder 21 in the mount 19. The shock absorber housing 13 is threaded into the bore 17 such that the end of the housing 13 abuts the shoulder 21 of the mount 19, and the piston rod 15 extends outwardly from the housing 13. A lock screw 23 is threaded into a threaded aperture 25 extending from the side of the mount 19 at an angle substantially perpendicular to the longitudinal axis of the shock absorber 11. The lock screw 23 engages the outer threads of the housing 13 of the shock absorber 11 in order to retain the shock absorber 11 in a predetermined position.

When the shock absorber 11 requires maintenance, the mount 19 is removed from a fixture 25 of an industrial machine, such as a blow molding machine (not shown). The lock screw 23 is unthreaded from engagement of the housing 13 of the shock absorber 11 so that the housing 13 may be unthreaded from the mount 19. Maintenance may then be performed on the shock absorber 11, and the shock absorber 11 may be threaded back into the mount 19. However, the lock screw 23 often damages the threads of the shock absorber housing 13 thereby making it difficult to thread the shock absorber housing 13 out of and into the mount 19. In some instances, the shock absorber housing 13 may not thread all the way into the bore of the mount 19 such that the shock absorber housing 13 does not engage the shoulder 21 of the mount 19. This may occur without the mechanic realizing that the shock absorber housing 13 is not threaded all the way into the bore. If this occurs and the shock absorber 11 and the mount 19 are placed back into the fixture 25, the piston rod 15 will not be in its proper position, thereby affecting the stroke length of the shock absorber 11. This, in turn, may affect the operation of the machine. Such shortcomings create an increase in the maintenance frequency of the shock absorbers 11 thereby creating an inefficiency that is undesirable in an industrial environment.

It is desirable to provide a quick change shock absorber that allows for the quick and easy maintenance of a high-cycling shock absorber while ensuring for the accuracy of the set up of the shock absorber.

SUMMARY OF THE INVENTION

The present invention relates to a quick change shock absorber for allowing the efficient removal and maintenance of a shock absorber in a fixture of an industrial machine. The quick change shock absorber provides a housing having a bore adaptable to hold fluid therein. A piston is slidably disposed within the bore of the housing and is engageable with a driver for movement between an extended position, wherein the piston has a portion extending outwardly from the housing, and a retracted position, wherein the piston is disposed within the housing. A connecting member extends from the housing and is engageable with a fixture having a bore therein for releasably connecting and locating the housing to the fixture.

The connecting member has an outer threaded portion, and the bore in the fixture has a threaded portion adaptable to receive the threaded portion of the connecting member for releasably connecting the housing to the fixture. The connecting member may have a substantially cylindrical configuration that extends integrally from the housing and may be coaxially aligned with a longitudinal axis of the housing. The housing may have a two-step outer periphery with a locating surface engageable with the fixture for properly locating the housing with respect to the fixture when the connecting member cooperatively engages the fixture.

BRIEF DESCRIPTION OF THE DRAWINGS

The description herein makes reference to the accompanying drawings wherein like referenced numerals refer to like parts throughout several views and wherein.

DETAILED DESCRIPTION OF THE PRESENT INVENTION

Figure 1:
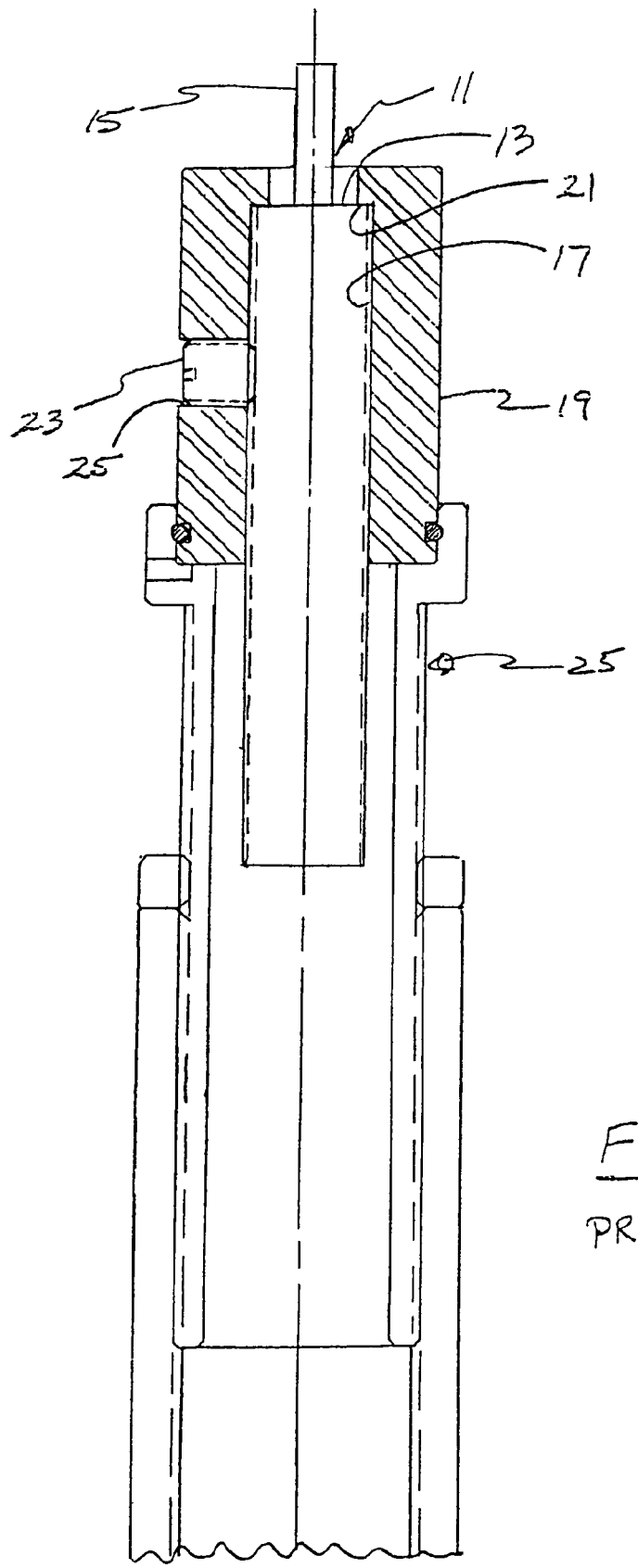
FIG. 1 is a sectional view of a prior art shock absorber.

Referring to the drawings, the present invention will now be described in detail with reference to the preferred embodiment.

Figure 2:
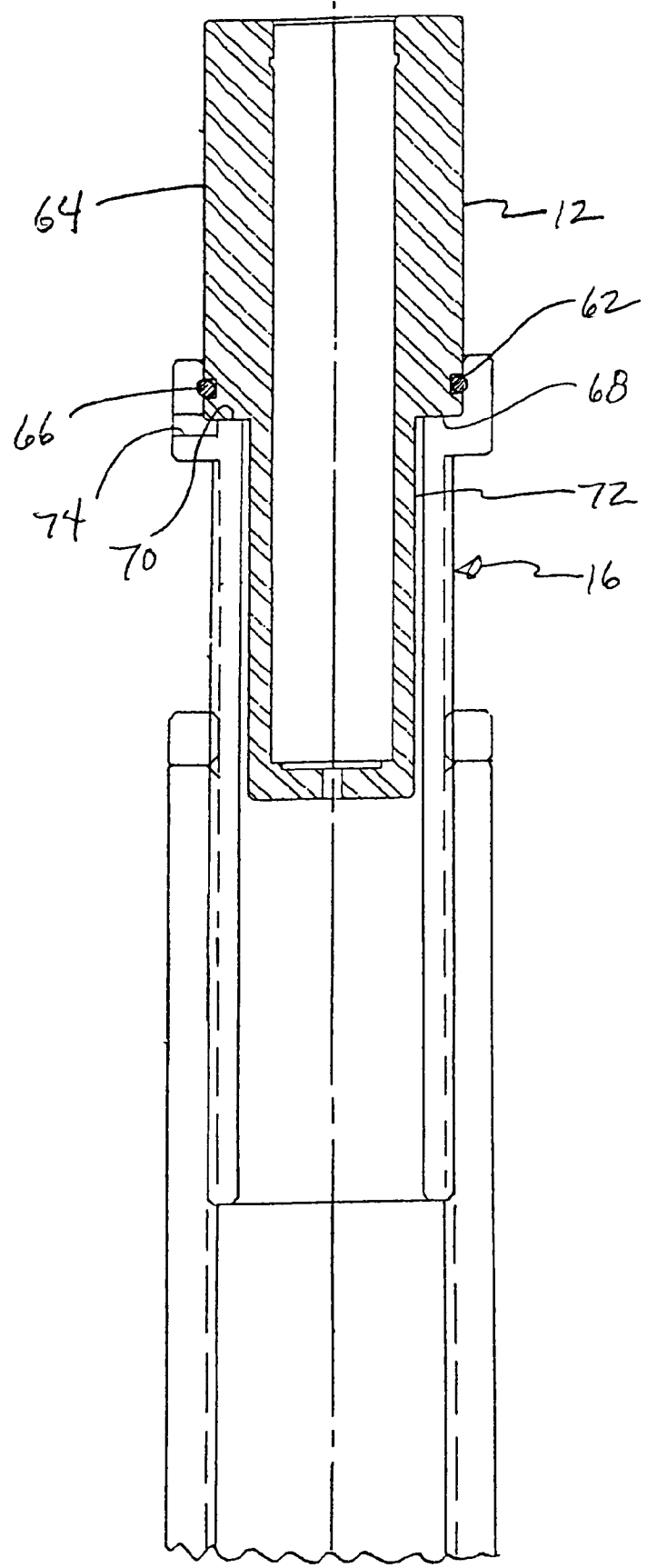
FIG. 2 is a sectional view showing the housing of the quick change shock absorber housing of the present invention disposed within a fixture.
Figure 3:
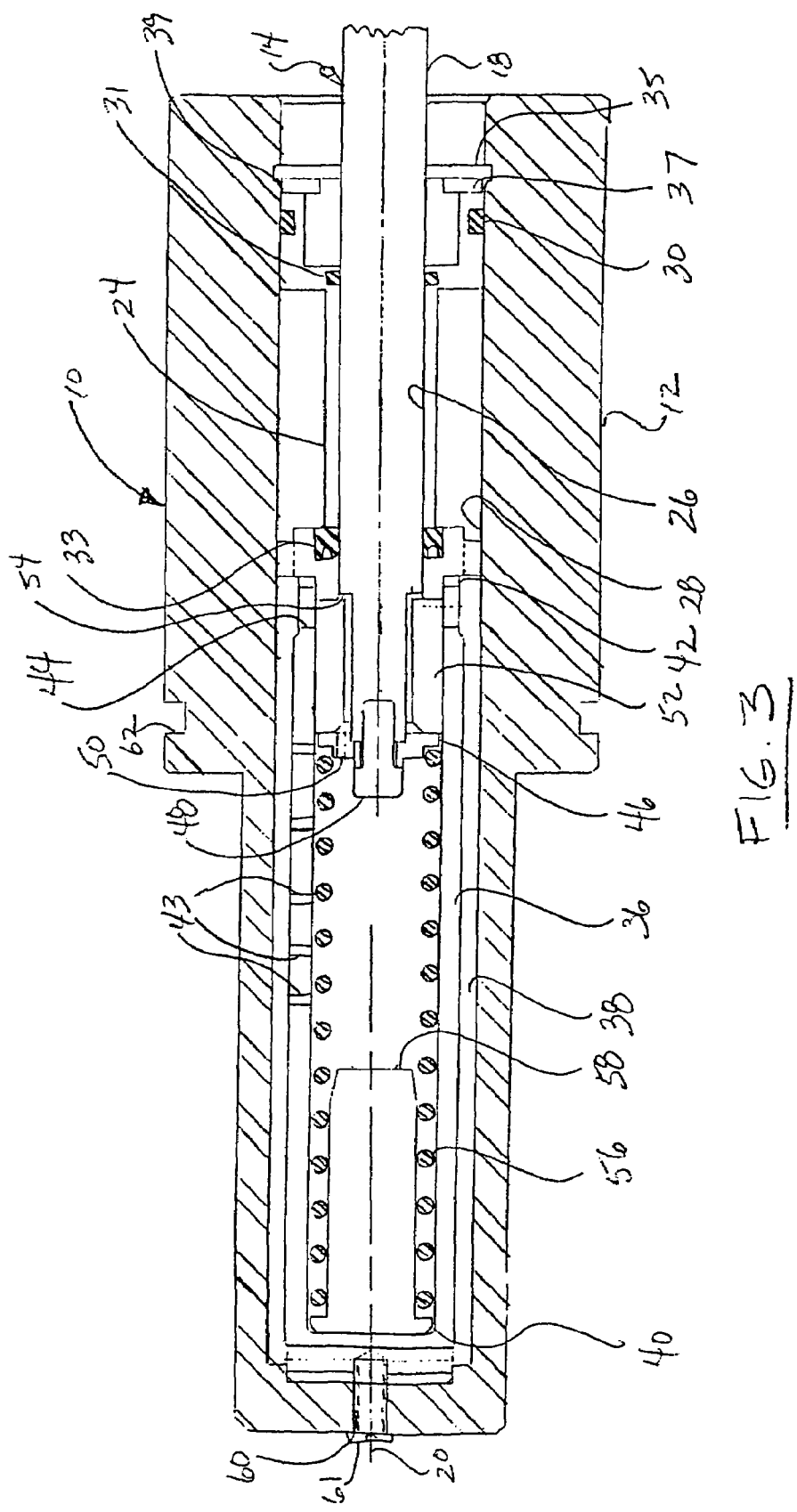
FIG. 3 is a sectional view of the quick change shock absorber of the present invention in the extended position.
Figure 4:
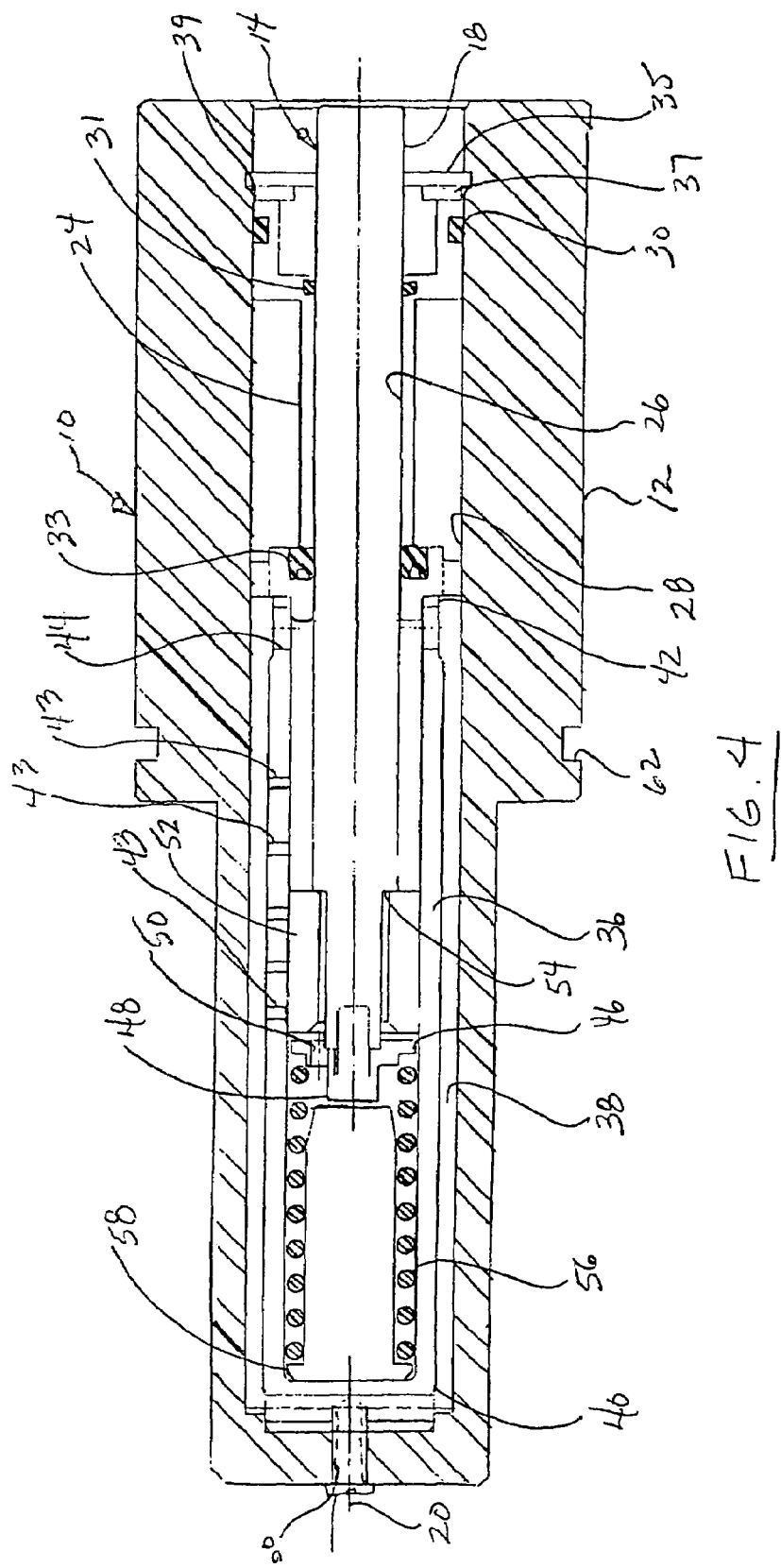
FIG. 4 is a sectional view of the quick change shock absorber of the present invention in the retracted position.

FIGS. 2–4 depict a quick change shock absorber 10 of the present invention. The quick change shock absorber 10 provides an enclosed, substantially cylindrical housing 12 having a fluid or oil disposed therein. A piston 14 is slidably disposed within the housing 12 and is engageable with a driver (not shown) for moving the piston 14 between an extended position, wherein the piston 14 has a portion extending outwardly from the housing 12 (as seen in FIG. 3), and a retracted position, wherein the piston 14 is disposed within the housing 12 (as seen in FIG. 4). The housing 12 is receivable by a fixture 16 of an industrial machine (not shown), such as a blow molding machine. Although the quick change shock absorber 10 is best suited for a blow molding machine that produces plastic bottles (not shown), the present invention is not limited to blow molding machines. In such an application, the piston 14 provides a substantially cylindrical piston rod 18 that is slidably received along a longitudinal axis 20 of the housing 12. One end of the piston rod 18 extends beyond a forward end of the housing 12 wherein the driver engages the end of the piston rod 18. The driver may comprise a striker (not shown) utilized to stretch a heated blank (not shown) in creating plastic bottles in the blow molding operation. While the striker stretches the heated blank longitudinally, pressurized air is inserted into the blank to stretch the bottle radially and form to a mold. The cycling rates of such blow molding machines increases the wear and maintenance required of shock absorbers, and therefore, the quick change shock absorber 10 of the present invention is ideal for these particular applications.

To allow the piston rod 18 to slide within the housing 12, the piston rod 18 is slidably supported along the longitudinal axis 20 of the housing 12 by a piston rod bearing 24, as seen in FIGS. 3–4. The piston rod bearing 24 is substantially cylindrical and provides a bore 26 extending therethrough for slidably receiving the piston rod 18. The outer periphery of the piston rod bearing 24 is sealed against the inner wall or bore 28 of the housing 12 by an O-ring 30. The inner periphery of the piston rod bearing 24 provides a sealed engagement against the piston rod 18 through the use of a wiper O-ring 31 and a U-cupped seal 33. The sealed engagement of the piston rod bearing 24 to the inner wall 28 of the housing 12 and to the piston rod 18 provides a sealed chamber for housing the fluid or oil. The piston rod bearing 24 is maintained within the housing 12 by a washer 35 and a snap ring 37. The snap ring 37 is seated within a recess or groove 39 provided in the inner wall or bore 28 of the housing 12.

In order to provide a fluid reservoir 38 for the proper operation of the piston 14, an elongated open-ended cylinder 36 is disposed in the rearward portion of the housing 12. The outer diameter of the cylinder 36 is smaller than the inner diameter of the bore 28 of the housing 12 such that a space is created between the adjacent walls of the cylinder 36 and the housing 12 to form the fluid reservoir 38. The cylinder 36 has a closed end 40 at the rearward end of the housing 12 and an open end 42 adjacent an end of the piston rod bearing 24. The open end 42 of the cylinder 36 overlaps and abuts the end of the piston rod bearing 24. A plurality of ports 43 are provided at longitudinally spaced locations along the side walls of the cylinder 36. The ports 43 are exponentially spaced to provide a relatively constant, resistive force when moving from the extended position to the retracted position. The position of the ports 43 may be rearranged in predetermined positions to provide various dampening characteristics. An aperture 44 is also provided in the wall of the cylinder 36 at the open end 42 of the cylinder 36 to allow for the flow of fluid or oil between the reservoir 38 and the interior portion of the cylinder 36.

To provide the dampening characteristics of the quick change shock absorber 10, a rearward end of the piston rod 18 is disposed within the cylinder 36. A piston head retainer 46 is connected to the rearward end of the piston rod 18 through the use of a fastener 48. The piston head retainer 46 is substantially cylindrical and has a three step diameter. The largest diameter of the piston head retainer 46 is slightly smaller than the inner diameter of the cylinder 36 such that fluid or oil can flow between the piston head retainer 46 and the cylinder 36. An aperture 50 substantially parallel to the longitudinal axis 20 of the housing 12 is provided through the piston head retainer 46 to allow for fluid or oil to flow through the piston head retainer 46.

In order to vary the dampening force when moving toward the retracted position as opposed to moving toward the extended position, a piston head 52 is captured between the piston head retainer 46 and a shoulder 54 of the piston rod 18. The piston head 52 is a substantially cylindrical member coaxially aligned with the longitudinal axis 20 of the housing 12. The inner diameter of the piston head 52 is somewhat larger than the outer diameter of the piston rod 18 thereby creating a space between the piston head 52 and the piston rod 18 such that fluid or oil can flow between the piston head 52 and the piston rod 18. The outer diameter of the piston head 52 is slightly smaller than the inside diameter of the cylinder 36 so as to provide a close slip fit tolerance between adjacent surfaces such that the migration of fluid between the cylinder 32 and the piston head 52 is minimized, and the fluid or oil flows between the piston head 52 and the piston rod 18.

The length of the piston head 52 is somewhat shorter than the distance between the piston head retainer 46 and the shoulder 54 of the piston rod 18. This allows the piston head 52 to shift and abut the piston head retainer 46 when moving toward the extended position and shift and abut the shoulder 54 of the piston rod 18 when moving toward the retracted position. When the piston rod 18 is moving toward the extended position, the piston head 52 abuts the piston head retainer 46, and fluid or oil flows through the aperture 50 of the piston head retainer 46 and between the piston head 52 and the piston rod 18. In addition, fluid or oil is allowed to flow from the reservoir through the ports 43 to the internal portion of the cylinder 36 as the piston rod 18 continues to move toward the furthest extended position. When the piston rod 18 moves toward the retracted position, the piston head 52 engages the shoulder 54 of the piston rod 18 such that fluid is allowed to flow around the piston head retainer 46 as well as through the aperture 50 provided in the piston head retainer 46. Fluid or oil also flows through the ports 43 to the reservoir 38. The ports 43 are continuously blocked as the piston head 52 advances toward the retracted position, thereby allowing for the continued deceleration of the piston 14 at a desired dampening force. The displaced fluid or oil from the cylinder 36 is stored in reservoir 38 until piston 14 moves toward the extended position.

The piston rod 18 is biased toward the extended position by a compression spring 56. The compression spring 56 is seated on a spring support 58 which is disposed in the rearward portion of the housing 12 within the cylinder 36. The compression spring 56 has one end seated on the end of the spring support 58, and another end engaging the piston head retainer 56. The spring support 58 has a substantially cylindrical configuration that is substantially coaxial with the longitudinal axis 20 of the housing 12.

In order to drain or resupply the quick change shock absorber 10 with fluid or oil, an aperture 60 is provided in the end of the housing 12. A fastener or plug 61 may be removably inserted into the aperture 60 to plug the aperture 60. Fluid or oil may then be inserted or drained from the housing 12 of the shock absorber 10 through aperture 60 without having to disassemble the quick change shock absorber 10.

To provide for the quick changing of the shock absorber 10 within the fixture 16, the quick change shock absorber 10 has a two step outer diameter housing 12, as seen in FIG. 2. An annular recess 62 is formed in the larger diameter 64 of the two step diameter housing 12, and a rubber retaining ring 66 is disposed within the annular recess 62. The housing 12 of the shock absorber 10 is receivable by a two step inner bore of the fixture 16. The two step inner bore of the fixture 16 receives the housing 12 such that a shoulder 68 of the housing 12 formed at the point at which the larger and smaller diameters of the housing 12 meet, abuts a corresponding shoulder 70 on the two step diameter fixture 16. The smaller diameter 72 of the housing 12 is somewhat smaller than the smaller diameter of the fixture 16. However, the larger diameter 64 of the housing 12 has a sliding fit with the larger inner diameter of the fixture 16 such that the rubber retaining ring 66 provides a level of friction between the surfaces that corresponds to a snug fit. The snug fit ensures that the shock absorber 10 remains firmly seated within the fixture 16 while still allowing a user to remove the shock absorber 10 should maintenance need to be performed on the shock absorber 10. Since the forces on the shock absorber 10 are in the vertically downward position, the shoulders 68, 70 of the housing 12 and fixture 16, respectively, engage one another so that the shock absorber 10 remains seated in the fixture 16.

In operation, the shock absorber 10 is seated in the fixture 16. If the shock absorber 10 requires maintenance or service, the user or mechanic simply pulls the shock absorber 10 from the housing 12. If the user cannot remove the shock absorber 10 from the fixture 16, then the user may insert a tool (not shown) into a slot 74 provided in the fixture 16. The slot 74 allows the user to insert the tool under the shoulder 68 of the housing 12 and then pry or lift the housing 12 upward until the housing 12 is lifted from the fixture 16. Once the shock absorber 10 is removed from the fixture 16, the user may perform whatever maintenance is necessary on the shock absorber 10. The snap ring 37 at the end of the housing 12 allows the internal mechanisms of the shock absorber 10 to be easily removed. In addition, the aperture 44 on the end of the housing 12 provides easy access for draining and supplying fluid or oil to the internal portions of the housing 12 of the shock absorber 10. Once the proper maintenance is performed on the shock absorber 10, the shock absorber 10 is inserted back into the fixture 16. The housing 12 of the shock absorber 10 is inserted downward into the fixture 16 until the shoulder 16 of the housing engages the shoulder 70 of the fixture 16.

Figure 5:
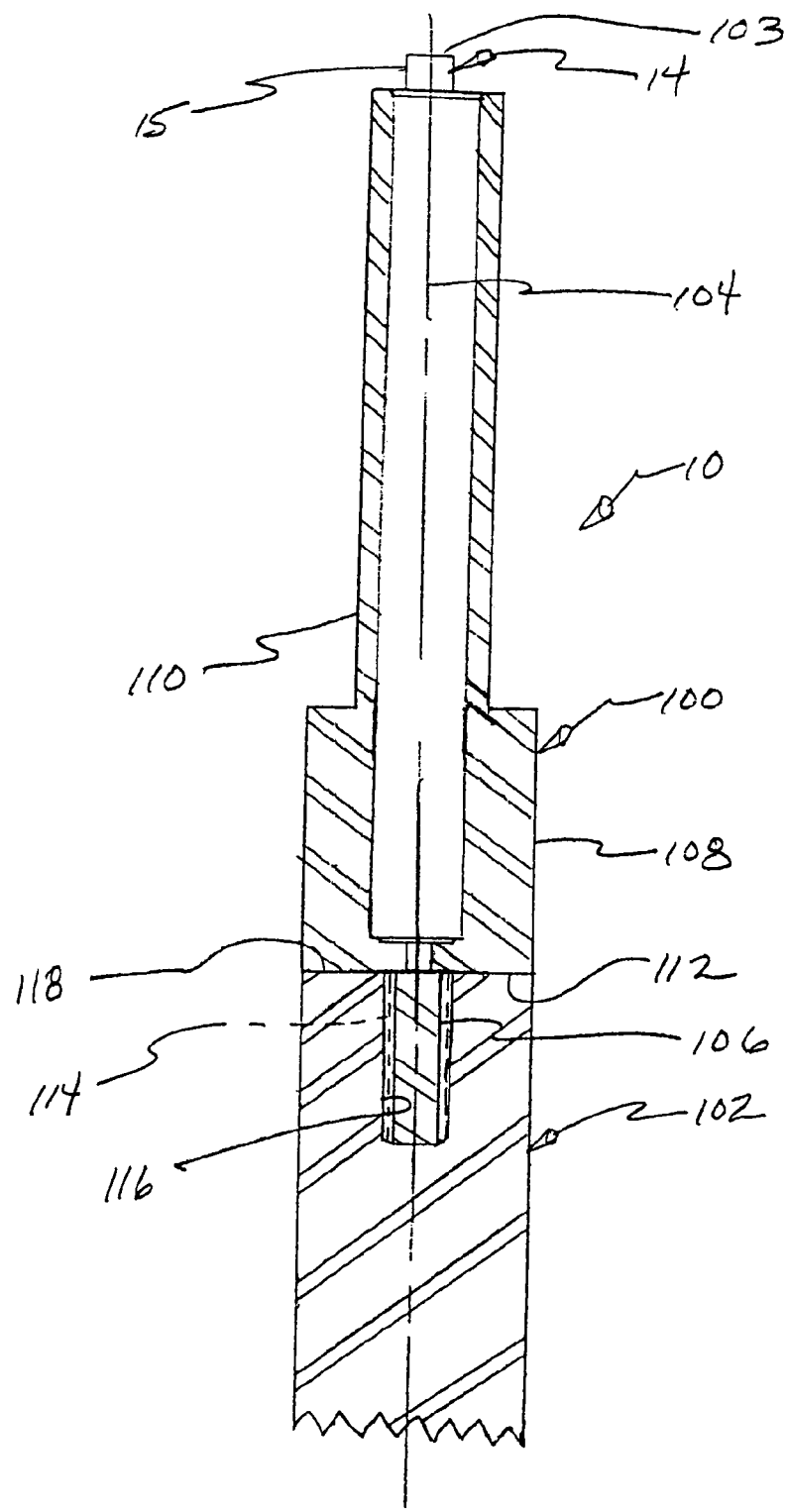
FIG. 5 is a sectional view of an alternative embodiment of the quick change shock absorber of the present invention.

In an alternative embodiment, the quick change shock absorber 10 of the present invention provides a housing 100 cooperatively engageable with a fixture 102 of an industrial machine (not shown), such as a blow molding machine. As seen in FIG. 5, the housing 100 of the quick change shock absorber 10 is enclosed and substantially cylindrical for housing a fluid or oil (not shown) therein. A piston 14, as similarly described in the previous embodiment, is slidably disposed within the housing 100 and is engageable with a driver (not shown) for moving the piston 14 between an extended position, wherein the piston 14 is disposed within the housing 100, and a retracted position, wherein the piston 14 is disposed within the housing 100. The piston 14 provides a substantially cylindrical piston rod 15, as similarly described in the previous embodiment, wherein a first end of the piston rod 15 is slidably received along a longitudinal axis 104 of the housing 100, and another end 103 of the piston rod 18 extends beyond the forward end of the housing 100 wherein the driver engages the end 103 of the piston rod 18. The piston 14 also has a piston head retainer 46 and a piston head 52, as similarly described in the previous embodiment and as best seen in FIGS. 2–4. The piston head retainer 46 is connected to the first end of the piston rod 15 and has an aperture extending therethrough for allowing fluid to flow therethrough. The piston head 52 is coaxially aligned with the piston rod 15 and is captured between the piston head retainer 46 and a shoulder 54 of the piston rod 15 for movement between the retracted position and the extended position. All other structure and structural support disposed within the housing 100 shall be substantially similar to that described in the previous embodiments.

To house the piston 14 and positively locate the housing 100 to the fixture 102, the housing 100 provides an outer periphery having a two-step outer diameter wherein a large diameter portion 108 is adjacent and closer to the fixture 102, and a small diameter portion 110 of the housing 100 is integral with and adjacent to the large diameter portion 108 of the housing 100, as seen in FIG. 5. Both the large diameter portion 108 and the small diameter portion 110 of the housing 100 are substantially cylindrical and have a smooth outer periphery. An end wall 112 of the large diameter portion 108 of the housing 100 is substantially flat and substantially perpendicular to the outer periphery of the housing 100.

In order to connect and locate the housing 100 of the present invention to the fixture 102, a connecting member 106 extends away from and is integral with the end wall 112 of the large diameter portion 108 of the housing 100. The connecting member 106 is substantially cylindrical and is coaxially aligned with the longitudinal axis 104 of the housing 100. The connecting member 106 has threads 114 formed on its outer periphery and adapted to threadably engage a blind, threaded bore 116 formed in the fixture 102. The fixture 102 may be substantially cylindrical with a substantially flat end wall 118 that is substantially perpendicular to an outer periphery of the fixture 102. The blind bore 116 is substantially cylindrical and extends through the end wall 118 of the fixture 102. When the connecting member 106 is fully threaded into the threaded bore 116, the end wall 112 of the large diameter portion 108 of the housing 100 abuts the end wall 118 of the fixture 102 thereby releasably connecting the housing 100 to the fixture 102 and positively locating the position of the housing 100 relative to the fixture 102.

In operation, when the quick change shock absorber 10 becomes damaged, the shock absorber 10 is removed from the fixture 102 by threading the connecting member 106 out of the bore 116 of the fixture 102. A new shock absorber 10 is provided, and the connecting member 106 is threaded into the threaded bore 116 until the end wall 112 of the housing 100 abuts the end wall 118 of the fixture 102. The shock absorber 10 is then properly connected and located for use.

While the invention has been described in connection with what is presently considered to be the most practical and preferred embodiment, it is to be understood that the invention is not to be limited to the disclosed embodiments, but to the contrary, it is intended to cover various modifications or equivalent arrangements included within the spirit and scope of the appended claims. The scope is to be accorded the broadest interpretation so as to encompass all such modifications and equivalent structures as is performed under the law.

What is claimed is:

1. A quick change shock absorber, comprising:
    a housing having a bore adaptable to hold a fluid therein;
    a piston slidably disposed within said bore of said housing, and said piston engageable with a driver for movement between an extended position, wherein said piston has a portion extending outwardly from said housing, and a retracted position, wherein said piston is disposed within said housing; and
    a connecting member extending from said housing and engageable with a fixture wherein said fixture has a bore for receiving said connecting member for releasably connecting and locating said housing to said fixture.

2. The quick change shock absorber stated in claim 1, further comprising:
    said connecting member having an outer threaded portion; and
    said bore of said fixture having a threaded internal portion adaptable to receive said threaded portion of said connecting member for releasably connecting said housing to said fixture.

3. The quick change shock absorber stated in claim 1, further comprising:
    said connecting member having a substantially cylindrical configuration.

4. The quick change shock absorber stated in claim 3, further comprising:
    said connecting member coaxially aligned with a longitudinal axis of said housing.

5. The quick change shock absorber stated in claim 1, further comprising:
    said connecting member extending from and integral with said housing.

6. The quick change shock absorber stated in claim 1, further comprising:
    said housing having a two-step diameter outer periphery.

7. The quick change shock absorber stated in claim 1, further comprising:
    said housing having a locating surface engageable with said fixture for properly locating said housing when said connecting member is cooperatively engaged with said bore of said fixture.

8. The quick change shock absorber stated in claim 1, wherein said piston further comprises:
    a piston rod having a first end slidably disposed within said housing;
    a piston head retainer connected to said first end of said piston rod and having an aperture extending therethrough; and
    a piston head coaxially aligned with said piston rod and captured between said piston head retainer and a shoulder of said piston rod for movement between said retracted position and said extended position.

9. A quick change shock absorber, comprising:
    a substantially cylindrical housing having a bore adaptable to hold a fluid therein;
    a piston slidably disposed within said bore of said housing, and said piston engageable with a driver for movement between an extended position, wherein said piston has a portion extending outwardly from said housing, and a retracted position, wherein said piston is disposed within said housing; and
    a substantially cylindrical threaded member extending from said housing and receivable by a fixture having a threaded bore therein for releasably connecting and locating said housing to said fixture.

10. The quick change shock absorber stated in claim 9, further comprising:
    said threaded member coaxially aligned with a longitudinal axis of said housing.

11. The quick change shock absorber stated in claim 9, further comprising:
    said threaded member integral with and extending from said housing.

12. The quick change shock absorber stated in claim 9, further comprising:
    said housing having a two-step diameter outer periphery.

13. The quick change shock absorber stated in claim 9, further comprising:
    said housing having a locating surface engageable with said fixture for properly locating said housing when said connecting member is cooperatively engaged with said bore in said fixture.

14. The quick change shock absorber stated in claim 9, wherein said piston further comprises:
    a piston rod having a first end slidably disposed within said housing;
    a piston head retainer connected to said first end of said piston rod and having an aperture extending therethrough; and
    a piston head coaxially aligned with said piston rod and captured between said piston head retainer and a shoulder of said piston rod for movement between said retracted position and said extended position.

15. A quick change shock absorber, comprising:
    a substantially cylindrical housing having a bore adaptable to hold a fluid therein;
    a piston slidably disposed within said bore of said housing and engageable with a driver for movement between an extended position, wherein said piston has a portion extending outwardly from said housing, and a retracted position, wherein said piston is disposed within said housing; and
    a substantially cylindrical threaded member integral with and extending from said housing, and said threaded member coaxially aligned with a longitudinal axis of said housing wherein said threaded member is adapted to threadably engage a threaded bore of a fixture for releasably connecting and locating said housing to said fixture.

16. The quick change shock absorber stated in claim 15, further comprising:
    said housing having a two-step diameter outer periphery.

17. The quick change shock absorber stated in claim 15, further comprising:
    said housing having a locating surface engageable with said fixture for properly locating said housing when said threaded member is cooperatively engaged with said fixture.

18. The quick change shock absorber stated in claim 15, wherein said piston further comprises:
    a piston rod having a first end slidably disposed within said housing;
    a piston head retainer connected to said first end of said piston rod and having an aperture extending therethrough; and
    a piston head coaxially aligned with said piston rod and captured between said piston head retainer and a shoulder of said piston rod for movement between said retracted position and said extended position.

* * * * *